(12) United States Patent
Hagendorf

(10) Patent No.: US 9,088,877 B1
(45) Date of Patent: Jul. 21, 2015

(54) SYSTEMS AND METHODS FOR INITIATING COMMUNICATION BETWEEN IM CLIENTS AND MOBILE CLIENTS

(75) Inventor: Pierre Hagendorf, Ra'anana (IE)

(73) Assignee: AVAYA, INC., Basking Ridge, NJ (US)

( * ) Notice: Subject to any disclaimer, the term of this patent is extended or adjusted under 35 U.S.C. 154(b) by 1287 days.

(21) Appl. No.: 11/522,653

(22) Filed: Sep. 18, 2006

Related U.S. Application Data

(60) Provisional application No. 60/717,715, filed on Sep. 16, 2005, provisional application No. 60/728,232, filed on Oct. 19, 2005.

(51) Int. Cl.
  *H04W 4/00* (2009.01)
  *H04W 4/12* (2009.01)
  *H04M 1/725* (2006.01)
  *H04L 12/58* (2006.01)
  *H04W 4/14* (2009.01)

(52) U.S. Cl.
  CPC ............ *H04W 4/12* (2013.01); *H04M 1/72552* (2013.01); *H04L 12/5895* (2013.01); *H04W 4/14* (2013.01)

(58) Field of Classification Search
  CPC ... H04L 51/04; H04L 12/581; H04L 12/5895; H04L 51/38; H04L 67/18; H04L 51/046; H04L 51/28; H04L 51/36; H04L 12/189; H04L 65/1016; H04L 67/24; H04L 51/32; H04W 4/12; H04W 4/14; H04W 4/16; H04W 88/02; H04W 88/184; H04W 4/00; G06Q 50/01; H04M 2203/4536

USPC .......... 455/466, 414.1, 418, 415, 412.1, 567; 709/204, 217, 206; 379/142.17

See application file for complete search history.

(56) References Cited

U.S. PATENT DOCUMENTS

| 7,428,580 | B2* | 9/2008 | Hullfish et al. | 709/207 |
| 2002/0177428 | A1* | 11/2002 | Menard et al. | 455/404 |
| 2003/0048811 | A1* | 3/2003 | Robie et al. | 370/509 |
| 2004/0152477 | A1* | 8/2004 | Wu et al. | 455/466 |
| 2005/0021645 | A1* | 1/2005 | Kulkarni et al. | 709/206 |
| 2005/0148351 | A1* | 7/2005 | Reding et al. | 455/466 |
| 2005/0220134 | A1* | 10/2005 | Lin | 370/437 |
| 2006/0058012 | A1* | 3/2006 | Caspi et al. | 455/415 |

* cited by examiner

*Primary Examiner* — Fred Casca

(57) ABSTRACT

In some embodiments, methods comprise: receiving a communication request from the IM client using a first server; delivering the received communication request to the mobile phone using the first server; recording information regarding the communication request; receiving a communication response from the mobile phone; associating the received response from the mobile phone with the communication request from the IM client based on the recorded information; and sending the received communication response to the IM client. In some embodiments, methods comprise: receiving a call from a mobile phone at a first server, wherein the call is made by dialing a number from the mobile phone, the number indicating that an IM client is an intended recipient of the call and identifying the IM client; sending a communication request to the IM client based on the received call using the first server.

15 Claims, 5 Drawing Sheets

SYSTEMS AND METHODS FOR INITIATING COMMUNICATION BETWEEN IM CLIENTS AND MOBILE CLIENTS

CROSS-REFERENCE TO RELATED APPLICATIONS

This application claims priority under 35 U.S.C. §119(e) to provisional patent Application No. 60/717,715, entitled, "System and Methods for Initiating Communication between IM Clients and Mobile Clients" filed on Sep. 16, 2005, and to provisional patent Application No. 60/728,232, entitled, "System and Methods for Initiating Communication between IM Clients and Mobile Clients" filed on Oct. 19, 2005, each of which is hereby incorporated by reference herein in its entirety.

FIELD OF THE INVENTION

The present invention generally relates to computer-to-mobile communications, and more particularly to a systems and methods for initiating multimedia calls between Instant Messaging (IM) clients and mobile (wireless) communication clients.

BACKGROUND OF THE INVENTION

IM-to-mobile phone call services allow IM clients on various computer hardware and software platforms (e.g., ICQ™, Microsoft Network (MSN) Messenger™, Yahoo Messenger™, Skype™) to communicate with mobile systems on cellular (wireless) networks. Such services have been implemented, for example, by Skype Limited, under the SkypeOut™ brand name. However, any connection enabled by such services raises billing problems. Particularly, it raises the question of who should bear the cost of the communication—whether it should be the initiator of the call; the recipient; or both of them. In the case of both the initiator and the recipient bearing the cost, a further question is what portions of the cost should be borne by each.

Conventionally, billing of IM-to-mobile calls is achieved in a number of different ways. Under the MSN Messenger™ model, the IM client can send instant messages to cellular devices for free. The instant messages are then translated into Short Message Service (SMS) messages. In this case, the service costs are typically borne by the cellular operator, but the responses by the mobile client are always subject to payment. In other words, only one party to the communication is required to pay for its share. Under a second model, the cellular customer may also be subject to payment for incoming SMS messages. This service is for message exchange only.

Yet another billing model is provided by the Skype™ software. Using the software, a user of the SkypeOut™ service can initiate Public Switched Telephone Network (PSTN) voice calls or mobile (or cellular) voice calls to a standard handset in certain countries from his IM client. Unlike computer-to-computer IM communication services, users do have to pay for this kind of service. In addition, the IM users are required to register in advance and to provide credit card numbers as a condition for using the system.

Conventional billing solutions described above have certain drawbacks. Having the recipient of the call bear the costs of the communication under the MSN Messenger™ model may expose the recipient for payment for unsolicited calls, which may negatively affect the number of users wishing to connect to the service.

Having the initiator of the call bear the costs of the communication, fully or partially, is equally problematic. IM services are usually provided on the Internet for free, and hence users may be reluctant to bear the cost of such communication. Additionally, billing IM users requires registration and provision of billing methods (such as credit card details), which may negatively affect the number of users willing to join such service. Therefore, it is desirable to provide IM-to-mobile phone services without burdening the users with pre-registration requirements and/or costs on unsolicited messages or calls.

Another problem with conventional technology is that a mobile phone user is prevented from initiating IM communication with an IM user. More particularly, mobile phones do not include any mechanism through which a user can enter the IM address of the IM user. For example, mobile phones typically utilize E.164-based numbering mechanisms (i.e., using digits, * symbol, and # symbol) to setup a conversation (typically using the Q.931 protocol). Addressing in the IM space, and in the Internet in general, is done using Uniform Resource Identifier (URI) and/or Uniform Resource Locator (URL) types of addresses and/or email addresses (which use both letters and digits). This makes it impossible to enter an IM address in typical mobile phones. Moreover, even if E.164-based numbering mechanisms could be used to identify IM address, the volume of IM addresses would require very long E.164 addresses. Therefore, it is desirable to provide IM-to-mobile phone services where both the IM user and the mobile phone user can initiate calls. Embodiments of the present invention are directed to these and other important objectives.

SUMMARY OF THE INVENTION

Embodiments of the present invention provide systems and methods for initiating communication between IM clients and mobile phones. Using various embodiments of the present invention, IM-to-mobile phone services can be provided without requiring an IM user to pre-register and without burdening the mobile phone users with unsolicited messages or calls. Various embodiments of the present invention also enable mobile phone users to initiate communication with IM users.

In some embodiments, methods for initiating communication between an Instant Messaging (IM) client and a mobile phone are provided, the methods comprising: receiving a communication request from the IM client using a first server; delivering the received communication request to the mobile phone using the first server; recording information regarding the communication request; receiving a communication response from the mobile phone; associating the received response from the mobile phone with the communication request from the IM client based on the recorded information; and sending the received communication response to the IM client.

In some embodiments, systems for initiating communication between an IM client and a mobile phone are provided, the systems comprising: a first server coupled with a computer network and a telephone network, wherein the IM client is coupled with the computer network and the mobile phone is coupled with the telephone network; wherein, the first server is configured to receive a communication request from the IM client, deliver the received communication request to the mobile phone, record information regarding the communication request, receive a communication response from the mobile phone, associate the received response from the mobile phone with the communication request from the IM client based on the recorded information, and send the received communication response to the IM client.

In some embodiments, methods for initiating communication between an IM client and a mobile phone are provided, the methods comprising: receiving a call from a mobile phone at a first server, wherein the call is made by dialing a number from the mobile phone, the number indicating that an IM client is an intended recipient of the call and identifying the IM client; sending a communication request to the IM client based on the received call using the first server.

In some embodiments, systems for initiating communication between an IM client and a mobile phone are provided, the systems comprising: a first server coupled with a computer network and a telephone network, wherein the IM client is coupled with the computer network and the mobile phone is coupled with the telephone network; wherein the first server is configured to receive a call from a mobile phone, the call being made by dialing a number from the mobile phone, the number indicating that an IM client is an intended recipient of the call and identifying the IM client; wherein the first server is configured to send a communication request to the IM client based on the received call.

BRIEF DESCRIPTION OF THE DRAWINGS

The Detailed Description of the Invention, including the description of various embodiments of the invention, will be best understood when read in reference to the accompanying figures wherein.

DETAILED DESCRIPTION OF THE INVENTION

Embodiments of the present invention provide systems and methods for initiating communication between IM clients and mobile clients. In accordance with the present invention, an IM user at an IM client may initiate a call with a mobile user at a mobile client by sending the mobile client a sign or message (e.g., such as an SMS message) asking the mobile user to call-back the IM client and thereby initiate an IM-mobile call automatically.

Figure 1:
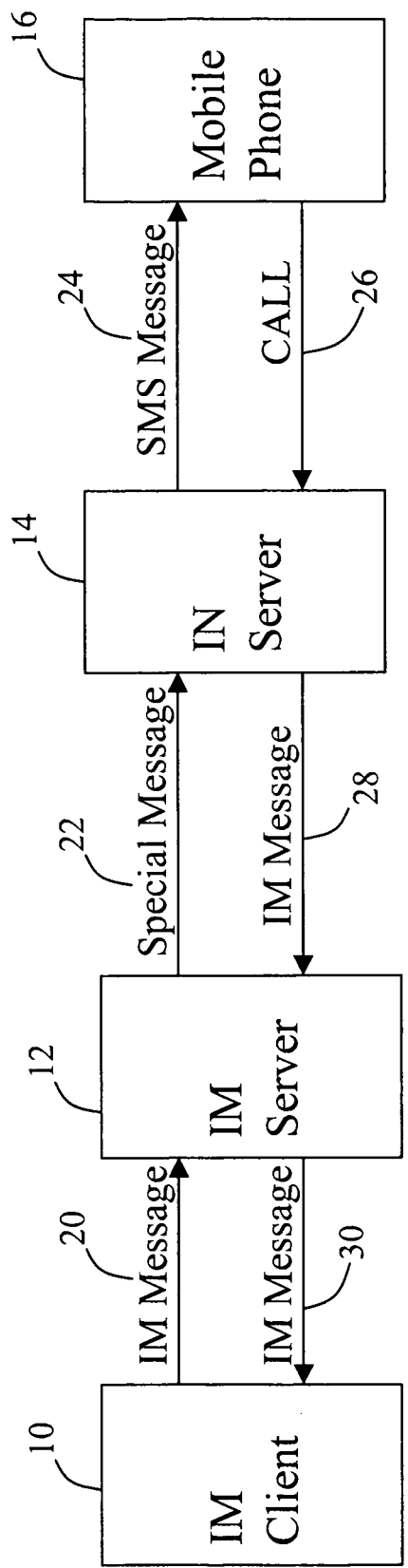
FIG. 1 is a flow diagram illustrating the initiation of IM communication from an IM client to a mobile phone, according to various embodiments of the present invention.

More particularly, as illustrated in the flow diagram of FIG. 1, an IM user (not shown) at an IM client 10 may desire to communicate via IM with a mobile user (not shown) at a mobile phone 16. Communicating via IM may include simple text IM, voice IM, video IM, or any combination of the same. In order to initiate communication, IM client 10 may send a suitable IM message 20 to IM server 12. IM server 12 may then send a special message 22 based on IM message 20 to an intelligent network (IN) server 14 in a mobile network. IM server 12 may be any suitable server for implementing instant messaging, or may be omitted when appropriate (in which case IM message 20 may be sent directly to IN server 14). Special message 22 may be a proprietary message, a nonpropriety message, a suitable IM message (and may be the same as IM message 20), etc., for setting up an IM conversation between IM server 12 and IN server 14. IN server 14 may then send an SMS message 24 to mobile phone 16. SMS message 24 is based on special message 22 and may be associated with an identification number (e.g., a phone number). The identification number can be used for identifying the IM user at IM client 10, for identifying the desired IM conversation, for indicating a generic acceptance of an incoming IM conversation request, and/or for performing any other suitable function.

Upon receiving the SMS message 24, the mobile user may decide to accept the IM conversation request and press a suitable button (e.g., a "send" button) on mobile phone 16. In response to this, mobile phone 16 may initiate a call 26 to IN server 14. This call may be placed to the identification number associated with SMS message 24. IN server 14 may then recognize call 26 as corresponding to the IM conversation request based upon the identification number called. Alternatively, IN server 14 may recognize the call as corresponding to the IM conversation request based upon the relative time between SMS message 24 and call 26, based upon the absence of an intermediate call, and/or based upon any other suitable factor(s). IN server 14 may then send a suitable IM message 28 to IM server 12. For example, IM message 28 may be a message indicating that the mobile user is accepting the IM conversation request. The IM message 28 may alternatively be any suitable special message. Finally, IM server 12 may send an IM message 30 to IM client 10 and thereby initiate the IM conversation.

To facilitate the IM conversation, IN server 14 may convert call 26 to any suitable format depending on the capabilities of mobile phone 16. For example, call 26 may be converted to a multi-media call, a voice only call, a web browsing call, etc.

Figure 2:
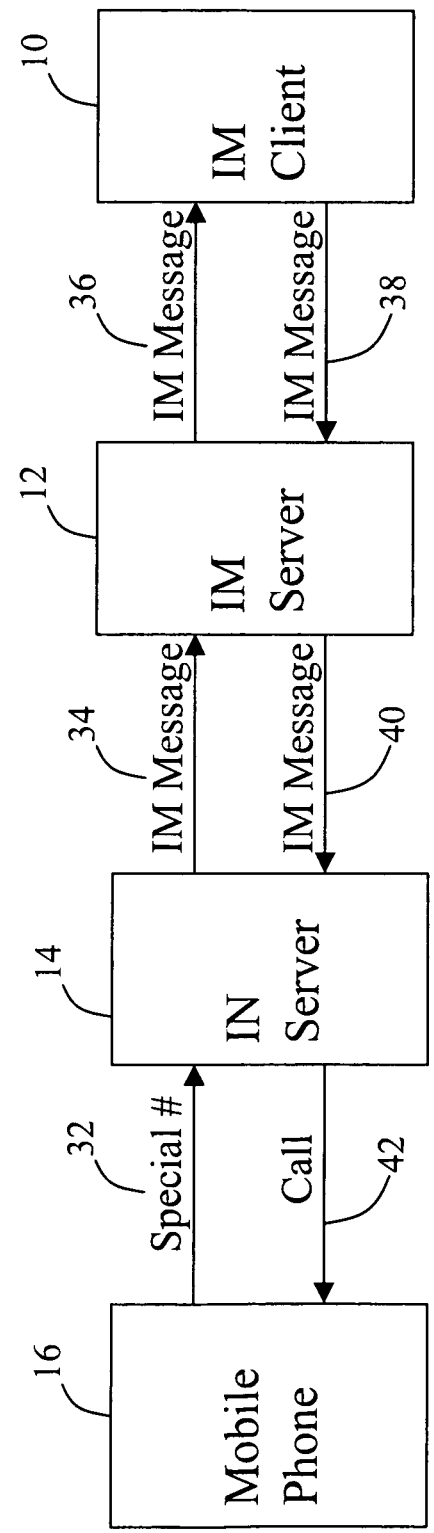
FIG. 2 is a flow diagram illustrating the initiation of IM communication from a mobile phone to an IM client, according to various embodiments of the present invention.

In addition, embodiments of the present invention provide systems and methods that enable a mobile phone user to initiate IM communication with an IM user. According to various embodiments as illustrated in the flow diagram of FIG. 2, a mechanism is provided to convert calls to special phone numbers to IM addresses. As illustrated in FIG. 2, this may be accomplished by a mobile user (not shown) at mobile phone 16 calling a special number such as "*55501". Within this number "*555" represents any suitable prefix to designate that the mobile user would like to make an IM call and "01" represents a number corresponding to a suitable "buddy." To enable each user to have multiple stored "buddies," a range of addresses, such as "*55501"-"*55599," may be provide to each user. The same set of numbers may be used by different users. In addition to this example, any other suitable numbering scheme could be implemented.

In response to the call initiated by the mobile user from mobile phone 16, IN server 14 may send a suitable IM message 34 to IM server 12. IM server 12 may then send a suitable IM message 36 to IM client 10. The IM user at IM client 10 may then respond to the IM message 36 by sending an IM message 38 to IM server 12. An IM conversation may then be established and IM messages 40 can be relayed between IM server 12 and IN server 14 in any suitable fashion. IM messages 40 may be transferred to mobile phone 16 as part of a call 42, which may be converted to any suitable form by IN server 14 depending on the capabilities of mobile phone 16. For example, call 42 may be converted to a multi-media call, a voice only call, a web browsing call, etc.

Although this example is illustrated in the context of making an IM call from a mobile phone, this technique could also be applied to sending an email from a mobile phone, or for any other suitable purpose.

Figure 3:
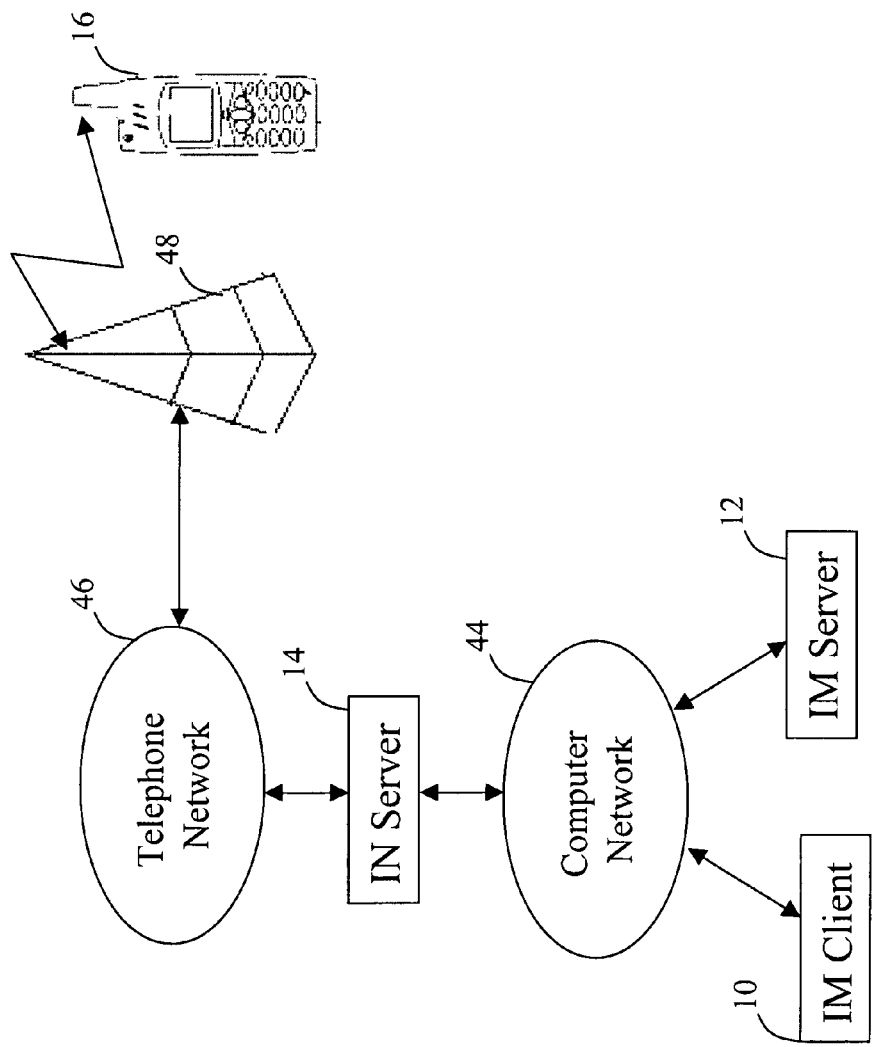
FIG. 3 is a diagram illustrating a system including an (Intelligent Network) IN server according to various embodiments of the present invention.

FIG. 3 is a block diagram illustrating one example of a system for implementing various embodiments of the present invention. As shown, the system includes an IM client 10 and an IM server 12 connected to network 44. IM client 10 can be any type of device that implements IM. For example, IM client 10 can be a personal computer (PC) with IM software installed. Computer network 44 could be any suitable computer network or combination of networks, and may include the Internet, local area networks, wide area networks, dial-up connections, wireless connection, DSL connection, cable connections, satellite connections, etc. Computer network 44 may be in communication with IN server 14, which may be in connection with telephone network 46.

Telephone network 46 may be any suitable telephone network or combination of networks, and may include a PSTN network, a private network, a wireless network, a satellite network, the Internet, etc. Telephone network 46 may also be connected to, integrated with, or part of a mobile network 48 that communicates with mobile phone 16. Mobile network 48 may be any suitable mobile communication network including, but not limited to, cellular networks, GSM networks, and/or satellite networks. As should be apparent to a person of ordinary skill in the art, embodiments of the present invention can be implemented using any other suitable system.

If desired, certain functions of IM server 12 and IN server 14 described above may be performed by the other of IN server 14 and IM server 12, by IM client 10, and/or by mobile phone 16. For example, IM server functions may be implemented in IN server 14, and/or vice versa. As should be apparent to a person of ordinary skill in the art, many modifications to the invention can be made without departing from the spirit and scope of the invention.

Figure 4:
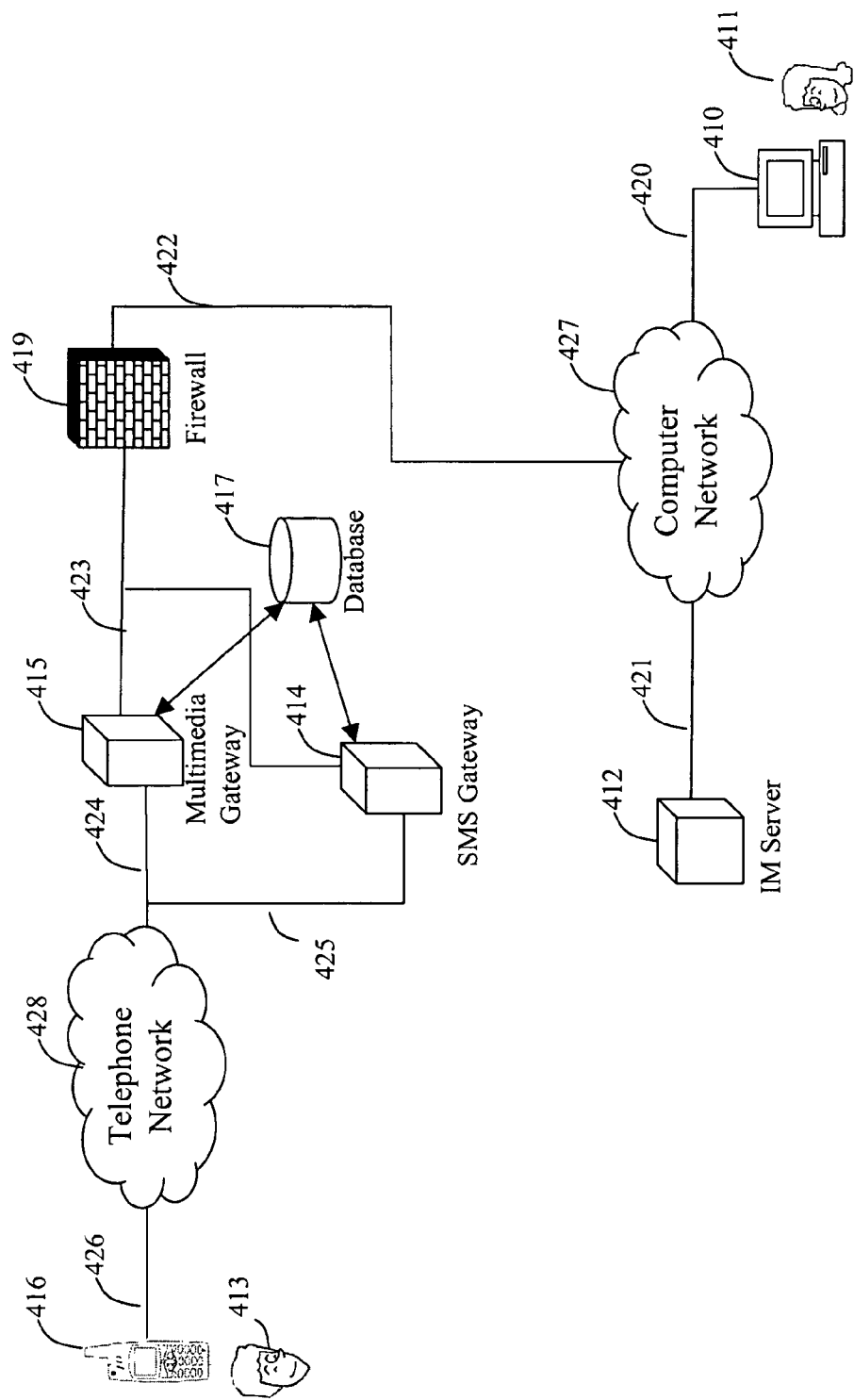
FIG. 4 is a diagram illustrating a system including a multimedia gateway and a Short Message Service (SMS) gateway, according to various embodiments of the present invention.

FIG. 4 is a diagram depicting a system of various embodiments of the present invention. In FIG. 4, an IM user 411 at an IM client 410 may desire to initiate communication (e.g., a multimedia call) from IM client 410 with a mobile user 413 at a mobile phone 416. Communicating via IM may include text, voice, video (which may be still or moving), and/or any combination of the same.

To initiate communication, user 411 at IM client 410 may select the mobile user 413 (e.g., using a "buddy" list or any other suitable mechanism) and thus cause client 410 to send a message to IM server 412 via computer network (e.g., Internet) 427. IM server 412 may be any suitable server for implementing IM. IM server 412 may be omitted when appropriate, e.g., in a peer-to-peer IM environment. In this case, messages from IM client 410 may be sent directly to SMS gateway 414 or mobile phone 416, as set forth below).

After receiving the message from client 410, IM Server 412 may determine if mobile user 413 (or mobile phone 416) is online. If IM server 412 determines that mobile phone 416 is online, the IM server may send a suitable IM message to user 413 prompting him of the incoming IM conversation request. Otherwise, if IM server 412 determines that user 413 is not online, IM server 412 may then send a message to SMS gateway 414 requesting it to notify mobile phone 416 of the IM conversation request. SMS gateway 414 may be any suitable gateway for connecting an IM environment to an SMS environment, and may be located on the border of, or may be otherwise be connected to, a mobile network (e.g., network 428).

In addition to the function described above, SMS gateway 414 may translate audio/video codecs and other communication characteristics that differ between the networks (e.g., converting the AMR codec in a 324M network to/from iLBC/G.723 audio or other codecs used in the IM network), translate other audio and video characteristics (e.g., perform video rate matching), insert information into the conversation (e.g., such as advertisements (e.g., to keep costs low), call information, or emergency bulletins), and/or perform any other suitable functions. Alternatively, SMS gateway 414 may be omitted when appropriate (in which case IM server 412 (in a client-server configuration) or IM client 410 (in a peer-to-peer configuration) may send a message to an IM client (not shown) that resides on mobile phone 416).

Upon receiving a communication request, SMS gateway 414 may send an SMS message to mobile phone 416 via mobile telephone network 428. Telephone network 428 can be, e.g., a Universal Mobile Telecommunication System (UMTS) network. The SMS message may include information that identifies to what telephone number (e.g., call back number) mobile phone 416 may call in order to initiate communication (e.g., a multimedia call) between mobile phone 416 and IM client 410. The SMS message may also include information identifying the IM user 411 at IM client 410, indicating the cost for initiating the conversation, or indicating any other suitable information. SMS gateway 414 may store suitable information in a database 417 to subsequently complete initiation of the IM conversation should user 413 respond to the SMS message.

Upon receiving the SMS message, user 413 may decide to continue initiation of the IM conversation. This may be accomplished by calling multimedia gateway 415 at the call back number indicated in the SMS message (for example, by pressing the "send" button on mobile phone 416 in response to the displayed message).

Multimedia gateway 415 may then determine the identity of the IM conversation. This determination may be based on the phone number of mobile phone 416 (as indicated by caller-id), and/or the number called, and/or any other suitable information. Gateway 415 may also access data previously stored in database 417 (such as which IM conversation(s) corresponds to a particular mobile phone 416). For example, gateway 415 may query database 417 to translate the called number to a valid URI. After identifying the IM conversation, multimedia gateway 415 may connect the call of mobile phone 416 to the IM conversation, and hence IM client 410, either directly or via IM server 412.

A variety of protocols may be used to establish the IM conversation as set forth above. For example, communication links 420, 421, 422, 423 between IM client 410, IM server 412, SMS gateway 414, and multimedia gateway 415 can be based on Session Initiation Protocol (SIP) or any suitable proprietary protocol. Communication link 425 between SMS gateway 414 and network 428 may be based on Signaling System 7 (SS7) protocol. Communication link 426 between network 428 and mobile phone 416 may be based on 3G-324M/radio protocol. The communication link between network 428 and multimedia gateway 415 may be based on 3G-324M/E1 protocol. Any other suitable protocols may additionally or alternatively be used in accordance with the present invention. The messages exchanged as described above may be any suitable messages. For example, the messages may be proprietary messages, non-propriety messages, suitable IM messages, etc.

Network 427 may be any suitable computer network or combinations of the same. For example, network 427 may include the Internet, an intranet, a local area network, a wide area network, a wired network, a wireless network, etc. As shown in FIG. 4, any suitable firewall 419 may also be present to protect SMS gateway 414 and multimedia gateway 415 from unauthorized activity.

Figure 5:
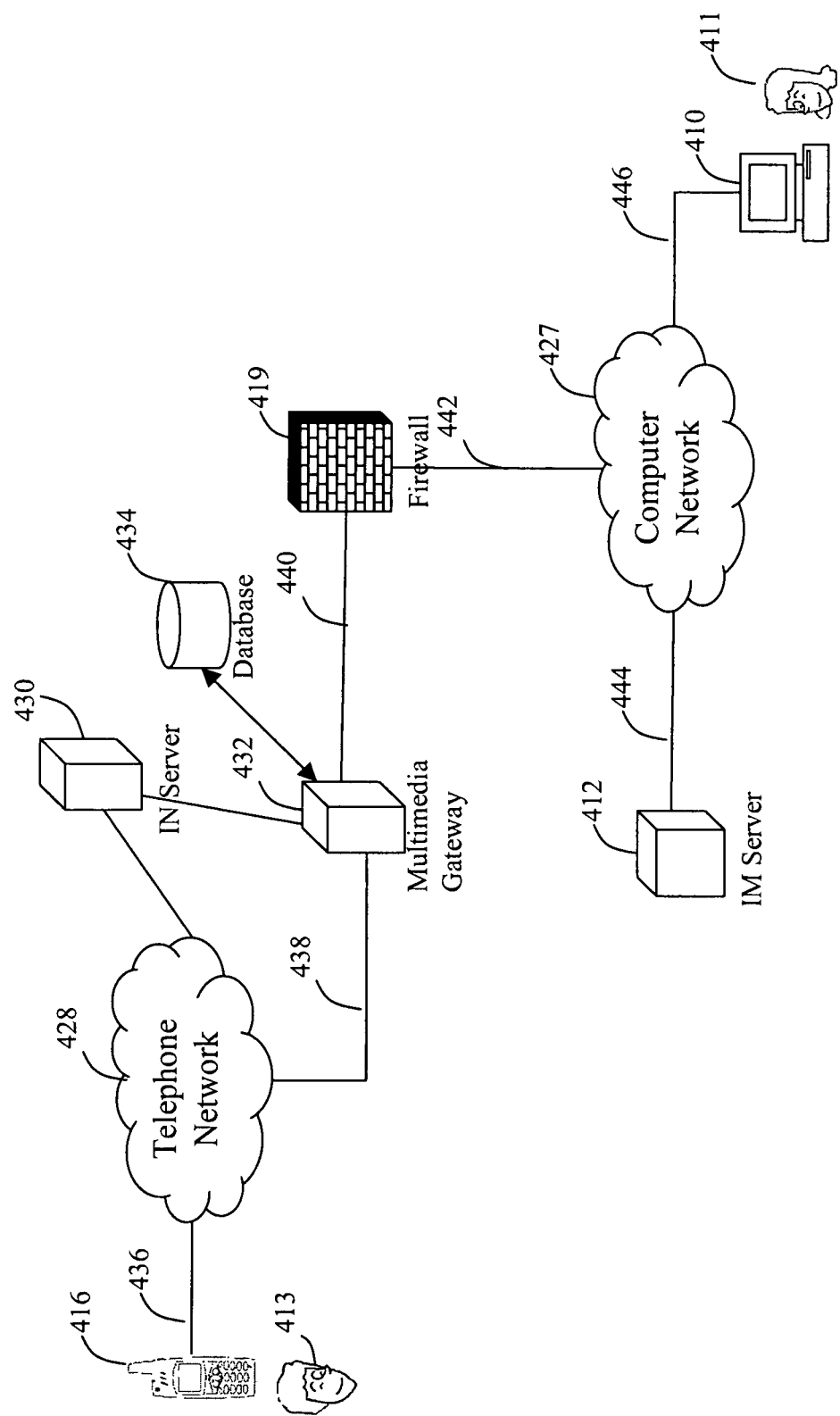
FIG. 5 is a diagram illustrating a system including an IN server and a multimedia gateway, according to various embodiments of the present invention.

FIG. 5 is a diagram illustrating another system that enables a mobile phone user to initiate IM communication with an IM user, according to various embodiments of the present invention. To initiate the IM communication, mobile user 413 at mobile phone 416 can call a special number indicating that the user would like to make an IM call and indicating the recipient of the call. While an example has been given in connection to FIG. 2, any suitable numbering scheme could be implemented. These special numbers may be associated with IM addresses using any suitable mechanism. For example, a Web page interface that can be accessed using a browser on a mobile phone or computer can be used to allow users to enter numbers and corresponding IM addresses. In addition, SMS messages, Interactive Voice Response (IVR) systems, and/or any other suitable mechanism can be used for the same purpose.

This call made by dialing the special number may be routed by mobile telephone network 428 to IN server 430. Network 428 can be a UMTS mobile telephone network. IN server 430 may then forward the call to a suitable multimedia gateway 432. Multimedia gateway 432 may then access database 434 to determine what IM address to use. This determination may be based, for example, on the telephone number of mobile phone 416, the number dialed, and/or on any other suitable information. For example, if mobile phone 416 has a telephone number of (555) 123-4567, and mobile user 413 calls "*55501," the database may be used to determine that "*55501" for number (555) 123-4567 corresponds to an IM address "johnsmith" on AOL's Instant Messenger service. Database 434 may be any suitable database and may be connected to multimedia gateway 432 and may include any suitable mechanism for loading addresses into the database (e.g., such as a Web server).

After determining what IM address to use, multimedia gateway 432 may send a suitable message to IM server 412 via network 427. IM server 412 may then send a suitable IM message to IM client 410 also via computer network 427 to initiate the IM conversation. IM user 411 at IM client 410 may then accept the IM conversation and proceed as known in the art. Although this example is illustrated in the context of making an IM call, this technique could also be applied to sending an email from a mobile phone, or for any other suitable purpose.

A variety of protocols may be used to establish the IM conversation as set forth above. For example, communication link 436 between mobile phone 416 and network 428 can be based on 3G-324M/radio protocol. Communication link 438 between network 428 and multimedia gateway 432 may be based on 3G-324M/E1 protocol. Communication links 440, 444, 446 between multimedia gateway 432, IM server 412 and IM client 410 can be based on SIP or any suitable proprietary protocol. Any other suitable protocol or combinations of protocols could additionally or alternatively be used in accordance with the invention. Any suitable firewall 419 may also be present to protect server 430 and/or multimedia gateway 432 from unauthorized activity.

Other embodiments, extensions, and modifications of the ideas presented above are comprehended and within the reach of one skilled in the art upon reviewing the present disclosure. Accordingly, the scope of the present invention in its various aspects should not be limited by the examples and embodiments presented above. The individual aspects of the present invention, and the entirety of the invention should be regarded so as to allow for modifications and future developments within the scope of the present disclosure. The present invention is limited only by the claims that follow.

The invention claimed is:

1. A method for initiating communication between an Instant Messaging (IM) client and a mobile phone, the method comprising:

receiving, at a first server, a communication request from a non-mobile IM client to initiate an IM conversation with the mobile phone, wherein the communication request provides information for setting up the IM conversation between the first server and a second server;

sending a first message based on the communication request from the first server to a second server, said second server being connected to a mobile network, wherein said message comprises one of a non-proprietary message, a proprietary message and a message identical to said communication request;

generating and delivering, by the second server, a second message that is based at least in part on the first message sent by the first server to the second server to the mobile phone prior to receiving a registration request from the mobile phone, wherein the second message comprises an identification that identifies the IM conversation, wherein the second message requests that the mobile phone call the non-mobile IM client; and wherein delivering the received communication request to the mobile phone comprises transforming the received communication request to a (Short Message Service) SMS message comprising the identification number and delivering the SMS message to the mobile phone;

receiving, at the second server, a communication response from the mobile phone, wherein the communication response initiates a call between the non-mobile IM client and the mobile phone by placing a call to the identification number that identifies the IM conversation, and wherein receiving a communication response from the mobile phone comprises receiving a call placed to a first number; and wherein associating the received communication response from the mobile phone with the communication request from the IM client comprises comparing the first number with the delivered identification number; and sending the received communication response to the IM client to initiate the IM conversation.

2. The method of claim 1, wherein receiving a communication request from the IM client comprises:

receiving a IM communication request from the IM client at an IM server; and sending a first message representing the communication request from the IM server to a network server.

3. The method of claim 1, wherein delivering the received communication request to the mobile phone further comprises:

associating the received communication request with the identification number; and delivering the received communication request along with the identification number to the mobile phone.

4. The method of claim 3, wherein receiving a communication response from the mobile phone comprises receiving a call placed to a first number; and wherein associating the received communication response from the mobile phone with the communication request from the IM client comprises comparing the first number with the delivered identification number.

5. The method of claim 1, wherein the identification number indicates at least one of: an identity of an IM user at the IM client, a requested IM communication session, and a generic acceptance of an incoming IM conversation request.

6. The method of claim 1, wherein associating the received communication response from the mobile phone with the communication request from the IM client is based on at least one of the following factors: 1) time between delivering the communication request and receiving the communication response, and 2) absence of an intermediate call between delivering the communication request and receiving the communication response.

7. The method of claim 1, wherein sending the received communication response to the IM client comprises converting the received communication response to a suitable format.

8. The method of claim 1, further comprising:
upon associating the received response from the mobile phone with the communication request from the IM client, charging a user of the mobile phone for at least one communication message sent by the IM client.

9. A system for initiating communication between an instant messaging (IM) client and a mobile phone, the system comprising:
a network server coupled with a computer network and a telephone network, wherein a non-mobile IM client is coupled with the computer network and an IM server and the mobile phone is coupled with the telephone network;
wherein, the network server is configured to
receive a communication request from the IM client to initiate an IM conversation with the mobile phone, wherein the communication request provides information for setting up the IM conversation between the network server and the IM server:
generate and deliver a message that is based at least in part on the received communication request to the mobile phone using the network server prior to receiving a registration request from the mobile phone, wherein the message is associated with an identification number that identifies the IM conversation and wherein the message requests that the mobile phone call the non-mobile IM client;
receive a communication response from the mobile phone by receiving a call placed to a first number, wherein the communication response initiates a call between the non-mobile IMclient and the mobile phone by placing a call to the identification number that identifies the IM conversation;
upon receiving the communication request from the IM client, associate the received communication request with the identification number and deliver the received communication request along with the identification number to the mobile phone;
associate the received communication response from the mobile phone with the communication request from the IM client by comparing the first number with the delivered identification number; and
send the received communication response to the IM client to initiate the IM conversation.

10. The system of claim 9, wherein the network server receives the communication request from the IM client through the IM server.

11. The system of claim 9, wherein the network server is configured to transform the received communication request to a (Short Message Service) SMS message and deliver the SMS message to the mobile phone.

12. The system of claim 11, wherein the network server, upon receiving the communication request from the IM client, is further configured to associate the received communication request with an identification number and deliver the identification number in the SMS message to the mobile phone.

13. The system of claim 9, wherein the network server is configured to associate the received communication response from the mobile phone with the communication request from the IM client based on at least one of the following factors: 1) time between delivering the communication request and receiving the communication response, and 2) absence of an intermediate call between delivering the communication request and receiving the communication response.

14. The system of claim 9, further comprising a firewall configured to protect the network server from unauthorized activity.

15. The system of claim 9, wherein the network server comprises:
a SMS gateway configured to receive a communication request from the IM client, transform the communication request to a SMS message, deliver the SMS message to the mobile phone, and record information regarding the communication request in a database; and
a multimedia gateway configured to receive a communication response from the mobile phone, associate the received response from the mobile phone with the communication request from the IM client based on the recorded information in the database, and send the received communication response to the IM client.

* * * * *